(12) United States Patent
Lee

(10) Patent No.: US 7,946,329 B2
(45) Date of Patent: May 24, 2011

(54) AUTOMATED SYSTEM FOR MANUFACTURING PART OF FUEL CELL STACK

(75) Inventor: Jin Ho Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 153 days.

(21) Appl. No.: 12/271,169

(22) Filed: Nov. 14, 2008

(65) Prior Publication Data

US 2009/0271023 A1    Oct. 29, 2009

(30) Foreign Application Priority Data

Apr. 23, 2008   (KR) .................. 10-2008-0037507

(51) Int. Cl.
- B29C 65/02 (2006.01)
- B29C 65/74 (2006.01)
- B32B 38/04 (2006.01)
- H01M 8/00 (2006.01)

(52) U.S. Cl. ........ 156/516; 156/362; 156/557; 156/563; 156/569; 156/570; 156/572; 156/583.1; 429/483; 429/534; 429/535

(58) Field of Classification Search ............ 156/516, 156/362, 299, 557, 563, 569, 570, 572, 583.1; 429/535, 492, 534, 483
See application file for complete search history.

(56) References Cited

U.S. PATENT DOCUMENTS

2007/0116999 A1 *   5/2007   Kuramochi et al. ............ 429/30

FOREIGN PATENT DOCUMENTS

| JP | 2005-135655 | 5/2005 |
| JP | 2005-158293 | 6/2005 |
| JP | 2005-332697 | 12/2005 |
| JP | 2006-164881 | 6/2006 |

* cited by examiner

*Primary Examiner* — Linda L Gray
(74) *Attorney, Agent, or Firm* — Edwards Angell Palmer & Dodge LLP; Peter F. Corless

(57) ABSTRACT

The present invention realizes an automated system which automatically performs all processes including an inputting process, a bonding process, and a punching process using a robot in manufacturing an integrated part of an MEA and GDLs. Accordingly, with the automated system, it is possible to improve productivity and ensure consistent product quality.

10 Claims, 3 Drawing Sheets

AUTOMATED SYSTEM FOR MANUFACTURING PART OF FUEL CELL STACK

CROSS-REFERENCE TO RELATED APPLICATION

This application claims under 35 U.S.C. §119(a) the benefit of Korean Patent Application No. 10-2008-0037507 filed Apr. 23, 2008, the entire contents of which are incorporated herein by reference.

BACKGROUND (a) Technical Field

The present invention relates to an automated system for manufacturing a part of a fuel cell stack. More particularly, the present invention relates to an automated system for manufacturing an integrated MEA/GDL part of a fuel cell stack.

(b) Background Art

A fuel cell is a zero-emission power generation system and has attracted attention as a next generation green energy generation system.

A power generation system using the fuel cell has advantages in that it can be used in various fields such as a stationary power plant in a large building, a power source of an electric vehicle, a portable power supply, etc., and it can use various fuels such as natural gas, city gas, naphtha, methanol, waste gas, etc.

The fuel cells are classified into a molten carbonate fuel cell (MCFC), a solid oxide fuel cell (SOFC), a polymer electrolyte fuel cell (PEFC), a phosphoric acid fuel cell (PAFC), an alkaline fuel cell (AFC), etc, according to the electrolyte.

Among the above-mentioned fuel cells, PEFC has been intensively studied for some reasons. For example, PEFC has no problems of corrosion or evaporation due to the electrolyte and obtains a high current density per unit area since it uses a solid polymer as an electrolyte. Moreover, PEFC produces a remarkably high output and can be operated in a low temperature compared with the other fuel cells.

Normally, PEFC has an output voltage of about 1 V per unit cell. Accordingly, in order to manufacture a fuel cell that can output a desired voltage higher than 1 V, a stack structure in which a plurality of unit cells is electrically connected in series is most widely used.

A fuel cell stack comprises a membrane electrode assembly (MEA) including an anode electrode, a cathode electrode, and a polymer electrolyte membrane interposed between the electrodes, a gas diffusion layer (GDL), and a gasket. The fuel cell stack has a structure in which the GDLs for the gas diffusion are alternately stacked on the MEAs.

FIG. 1 is a schematic diagram showing a conventional process of manufacturing an integrated part of an MEA and GDLs of a fuel cell stack.

As shown in FIG. 1, the integrated part of the MEA and GDLs is manufactured into an MEA finished product in a 5-layer structure through a process of punching an MEA and a process of bonding the punched MEA and the GDLs by a hot press.

However, the conventional process has drawbacks. The productivity is low and product quality is inconsistent since the punching and bonding processes are performed manually and the transfer between the processes are performed manually as well. For example, a worker cuts the MEA using a punching press one by one. Then, it brings the punched MEA and stacks and bond the GDLs on the MEA. Subsequently, it inputs the bonded MEA and GDLs to a hot press to be compressed at a high temperature (about 110° C.) and at a high pressure (about 4 ton) to obtain the integrated part of the MEA and GDLs one by one.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides an automated system for manufacturing a part of a fuel cell stack. The system comprises: an MEA supply unit for supplying an MEA; a GDL supply unit arranged in parallel to the MEA supply unit for supplying a GDL; a hot press for compressing and bonding the MEA supplied from the MEA supply unit and the GDL supplied from the GDL supply unit at a high temperature and a high pressure; a punching press for cutting the bonded MEA and GDL into a predetermined size; and a robot for transferring the MEA of the MEA supply unit and the GDL of the GDL supply unit to the hot press, and transferring the bonded MEA and GDL from the hot press to the punching press.

Another aspect of the present invention provides an automated system including: an MEA supply unit for supplying an MEA; a first GDL supply unit arranged in parallel to the MEA supply unit for supplying a GDL; a second GDL supply unit arranged in parallel to the first GDL supply unit for supplying a GDL; a hot press for compressing and bonding the MEA supplied from the MEA supply unit and the GDLs supplied from the first and second GDL supply units at a high temperature and a high pressure; a punching press for cutting each of the bonded MEA and GDL received from the hot press into a predetermined size; and a first robot for transferring the MEA of the MEA supply unit and the GDL of the first GDL supply unit to the hot press; and a second robot for transferring the MEA of the MEA supply unit and the GDL of the second GDL supply unit to the hot press and transferring the bonded MEA and GDL received from the hot press to the punching press.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
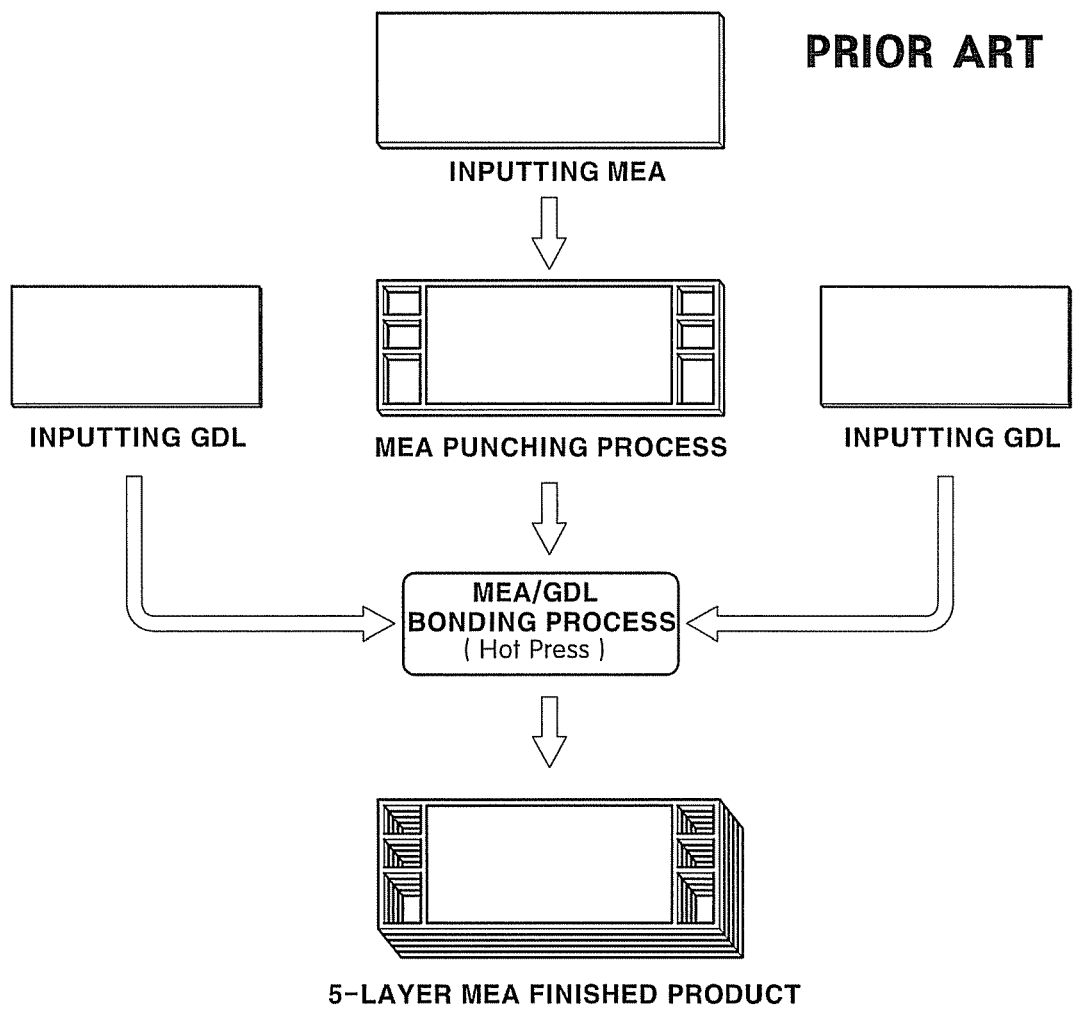
FIG. 1 is a schematic diagram showing a conventional process of manufacturing an integrated part of an MEA and GDLs of a fuel cell stack.

Reference numerals set forth in the Drawings includes reference to the following elements as further discussed below:

| | |
|---|---|
| 10: MEA supply unit | 11: first GDL supply unit |
| 12: hot press | 12a: first hot press |
| 12b: second hot press | 13: second GDL supply unit |
| 14: robot | 14a: first robot |
| 14b: second robot | 15: punching press |
| 16: elevator device | 17: screw bar |
| 18: elevating plate | 19: screw shaft |
| 20: motor | 21: belt drive |
| 22: base | 23: guide |
| 24: pin | 25: picker |
| 26a, 26b, 26c: mold | 27: support |
| 28: structure | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
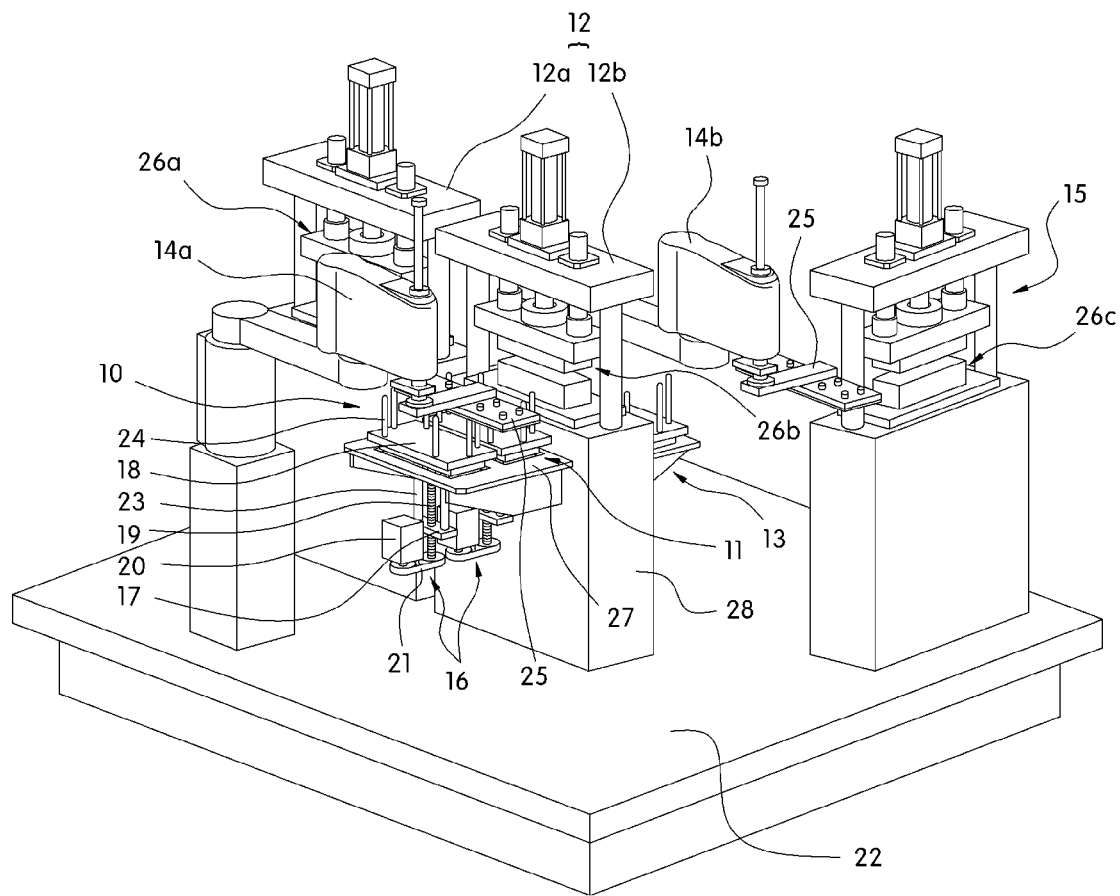
FIG. 2 is a perspective view showing an automated system for manufacturing an integrated part of an MEA and GDLs of a fuel cell stack in accordance with a preferred embodiment of the present invention.

FIG. 2 is a perspective view showing an automated system for manufacturing an integrated part of an MEA and GDLs of a fuel cell stack in accordance with a preferred embodiment of the present invention.

As shown in FIG. 2, the automated system comprises various components arranged in a predetermined layout. More specifically, the automated system comprises an MEA supply unit 10, a first GDL supply unit 11, a second GDL supply unit 13, a hot press 12, a robot 14, and a punching press 15 in a predetermined layout on a base 22.

The MEA supply unit 10 and the first GDL supply unit 11 are installed on a support 27 provided on one side of a structure 28 mounted on the base, and the second GDL supply unit 13 is installed on another support 27 provided on the other side of the structure 28.

The MEA and GDL supply units 10, 11, 13 may supply unit MEAs and unit GDLs continuously, respectively to a predetermined portion of the hot press. The unit MEAs and GDLs may be stacked before being supplied to the predetermined portion. They may be stacked in various ways. Preferably, they may be stacked horizontally. More preferably, they may be stacked vertically. In case where they are stacked vertically, it may be configured such that any particular unit of the stacked units may be supplied to the predetermined portion of the hot press. Preferably, the bottom unit of the stacked units may be supplied to the predetermined portion of the hot press. More preferably, the top unit of the stacked units may be supplied to the predetermined portion of the hot press.

In case where the top unit of the stacked MEA and GDL units is supplied to the predetermined portion, the MEA and GDL supply units each can be configured, preferably, such that the stacked MEA and GDL units are elevated according as the top unit of the stacked units is supplied to the predetermined portion of the hot press. In this case, the stacked MEA and GDL units can be elevated in various ways. For example, they can be elevated when each of the top unit is supplied to the predetermined portion. Also, for example, they can be elevated at a predetermined time interval.

As shown in FIG. 2, the unit MEAs and GDLs may be stacked on an elevating plate 18. A pin 24 is provided at the four corners of the elevating plate 18 such that the unit MEAs and GDLs can be aligned and stacked in an area defined by the four pins 24.

Each of the MEA and GDL supply units includes an elevator device 16 for moving up and down the elevating plate 18 on which the unit MEAs and GDLs are stacked. As shown in FIG. 2, two guides 23 are formed to extend to the bottom of the elevating plate 18. A screw bar 17 is provided between the bottom ends of the two guides 23. A vertical screw shaft 19 is arranged in parallel with and between the guides 23 and screw-connected through the screw bar 17. The screw shaft 19 is connected to a motor 20 to be driven by a belt drive 21. Accordingly, when the motor 20 is driven, the screw shaft 19 is rotated, the screw bar 17 is thereby moved up or down, and the elevating plate 18 on which the unit MEAs and GDLs are stacked, in turn, is moved up or down.

Here, although not shown in the figure, the motor 20, the screw shaft 19, and the guides 23 may be supported by brackets which appropriately extend from the base 22 or the support 27.

After the unit MEA and GDLs are stacked in an appropriate order and supplied to the predetermined portion (e.g., working area) of the hot press 12, the hot press 12 compresses the stacked MEA and GDLs at a high temperature and a high pressure to be integrated.

The hot press 12 may include one or more subunits. As shown in FIG. 2, for example, it may have a first hot press 12a and a second hot press 12b. The first and second hot presses may be arranged in various ways. Suitably, they may be arranged in parallel to each other. Also suitably, they may be arranged in series (FIG. 2). With these two subunits, it is possible to perform the integrating process in two positions at the same time.

Accordingly, after the thus-stacked MEA and GDLs are positioned on molds 26a and 26b of the hot press 12, the molds 26a and 26b are operated to compress the stacked MEA and GDLs at a high temperature (e.g., about 110° C.) and at a high pressure (e.g., about 4 ton) to be integrated to produce a membrane in a 5-layer structure, for example.

The robot 14 not only transfers the unit MEA and GDLs to the working area of the hot press 12 but also draws the bonded MEA and GDLs out of the hot press 12 and supplies it to a working area of a punching press 15 for cutting.

The robot 14 may include one or more subunits. As shown in FIG. 2, for example, it may have a first robot 14a and a second robot 14b. In this case, the first robot 14a may suitably be disposed in an area where the MEA supply unit 10 and the first GDL supply unit 11 are provided and a second robot 14b may suitably be disposed in an area where the second GDL supply unit 13 is provided. The first robot 14a picks up at least one of the unit MEAs stacked in the MEA supply unit 10 and at least one of the unit GDLs stacked in the first GDL supply unit 11 and inputs the same to the working area of the hot press 12. The second robot 14b picks up at least one of the unit GDLs stacked in the second GDL supply unit 13, inputs the same to the working area of the hot press 12, picks up the bonded structure from the working area of the hot press 12, and inputs the same to the working area of the punching press 15. It should be noted, however, the function of the first and second hot presses can be adjusted according to factors such as working conditions or users' needs. For example, it can be configured that the first robot can transfer the bonded MEA and GDL from the first hot press to the punching press.

Suitably, the robot 14 may include a picker 25 for picking up the unit MEAs and GDLs. The type of the picker 25 is not limited to a particular one. An example of the picker 25 is one operated in a vacuum suction method as known in the art.

Preferably, the robot 14 may include one or more horizontal pivot joints. Also preferably, it may include an actuator to allow up and down operation of the picker.

The punching press 15 cuts the bonded structure into a predetermined size. It includes a mold 26c for punching and is provided on the base 22 through the structure 28. The position of the punching press 15 on the base is not limited to a particular location. That is, the punching press 15 can be positioned at any place as long as the robot 14 can perform its function between the hot press 12 and the punching press 15.

Here, any method known in the art for compressing or cutting the bonded structure by the operations of the hot press and the punching press can be used without any limitation.

The operation of the automated system having the above-described configuration will be described below.

Figure 3:
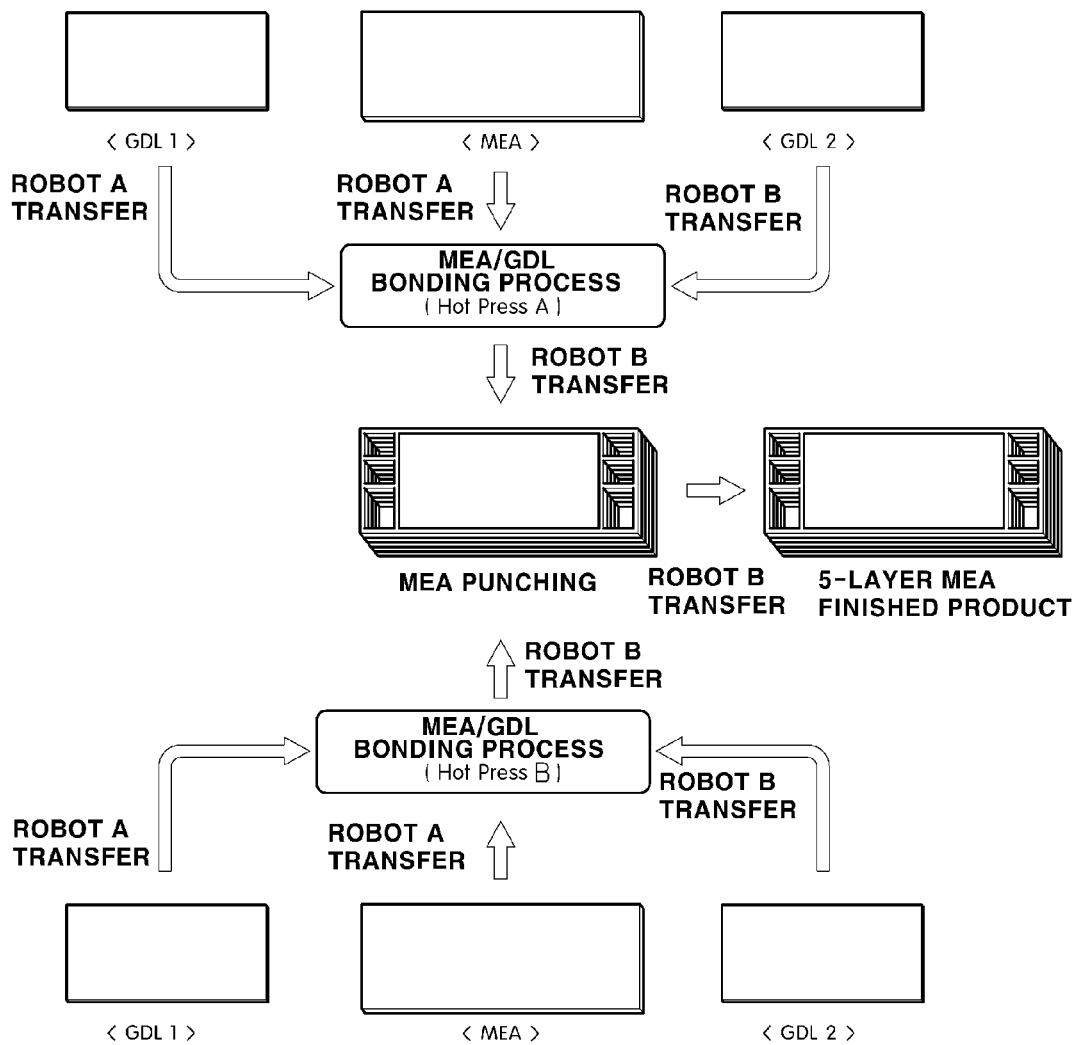
FIG. 3 is a schematic diagram showing a process of manufacturing an integrated part of an MEA and GDLs by using the automated system in accordance with the preferred embodiment of the present invention.

FIG. 3 is a schematic diagram showing a process of manufacturing an integrated part of an MEA and GDLs by using the automated system in accordance with the preferred embodiment of the present invention.

As shown in FIG. 3, the first robot and the second robot pick up an appropriate number of unit MEAs and GDLs from the MEA supply unit in an appropriate order, the first GDL supply unit, and the second GDL supply unit, and transfer them to the working area of the hot press.

Next, when the appropriate number of unit MEAs and GDLs are piled up in the working area of the hot press (e.g., 1 unit MEA and 2 unit GDLs are piled up in the working area of each of hot press subunit 12a, 12b to provide a membrane in a 5-layer structure), the hot press is operated to integrate them by compressing at a high temperature and a high pressure.

When the integration is completed, the second robot picks up the bonded structure and inputs the same to the working area of the punching press. Subsequently, the punching press is operated to cut the bonded part into a predetermined size to produce a finished product.

With the repetition of the above-described process, it is possible to automatically and continuously manufacture the integrated part of the MEA and GDLs.

It should be noted that the number and location of the robot or its subunit, the number and location of the hot press, the number and location of the punching press or its subunit can be adjusted depending factors such as working conditions.

It also should be noted that although the preferred embodiments describe 5-layered structure, the present invention can be applied for any other kinds of structure.

As described above, according to the present automated systems, all the processes from the input of the materials and the extraction of the finished products can be automatically performed, thereby improving the productivity and ensuring consistent product quality. Moreover, with the layout that allows the pressing process and the punching process to be simultaneously operated, it is possible to increase space efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An automated system for manufacturing a part of a fuel cell stack, the system comprising:
   a membrane electrode assembly (MEA) supply unit for supplying an MEA;
   a gas diffusion layer (GDL) supply unit arranged in parallel to the MEA supply unit for supplying a GDL;
   a hot press for compressing and bonding the MEA supplied from the MEA supply unit and the GDL supplied from the GDL supply unit at a high temperature and a high pressure;
   a punching press for cutting the bonded MEA and GDL into a predetermined size; and
   a robot for transferring the MEA of the MEA supply unit and the GDL of the GDL supply unit to the hot press, and transferring the bonded MEA and GDL from the hot press to the punching press,
   wherein an elevator device is provided in the MEA supply unit for elevating MEAs stacked in the MEA supply unit according as the MEA is supplied to a working area of the hot press.

2. The system of claim 1, wherein the elevator device comprises an elevating plate including a screw bar for a screw drive and supporting the stacked MEAs thereon, a vertical screw shaft screw-connected through the screw bar, a motor and a belt drive for driving the screw shaft.

3. The system of claim 1, wherein an elevator device is provided in the GDL supply unit for elevating GDLs stacked in the GDL supply unit according as the GDL is supplied to the working area of the hot press.

4. The system of claim 3, wherein the elevator device comprises an elevating plate including a screw bar for a screw drive and supporting the stacked GDLs thereon, a vertical screw shaft screw-connected through the screw bar, a motor and a belt drive for driving the screw shaft.

5. An automated system for manufacturing a part of a fuel cell stack, the system comprising:
   an MEA supply unit for supplying an MEA;
   a first GDL supply unit arranged in parallel to the MEA supply unit for supplying a GDL;
   a second GDL supply unit arranged in parallel to the first GDL supply unit for supplying a GDL;
   a hot press for compressing and bonding the MEA supplied from the MEA supply unit and the GDLs supplied from the first and second GDL supply units at a high temperature and a high pressure;

a punching press for cutting each of the bonded MEA and GDL received from the hot press into a predetermined size; and a first robot for transferring the MEA of the MEA supply unit and the GDL of the first GDL supply unit to the hot press; and a second robot for transferring the MEA of the MEA supply unit and the GDL of the second GDL supply unit to the hot press and transferring the bonded MEA and GDL received from the hot press to the punching press, wherein an elevator device is provided in the MEA supply unit for elevating MEAs stacked in the MEA supply unit according as the MEA is supplied to a working area of the hot press.

6. The system of claim 5, wherein the hot press comprises a first hot press and a second hot press.

7. The system of claim 6, wherein the first and second hot presses are arranged in parallel to each other or in series.

8. The system of claim 5, wherein the elevator device comprises an elevating plate including a screw bar for a screw drive and supporting the stacked MEAs thereon, a vertical screw shaft screw-connected through the screw bar, a motor and a belt drive for driving the screw shaft.

9. The system of claim 5, wherein an elevator device is provided in each of the first and second GDL supply units for elevating GDLs stacked in the first and second GDL supply units according as the GDL is supplied to the working area of the hot press.

10. The system of claim 9, wherein the elevator device comprises an elevating plate including a screw bar for a screw drive and supporting the stacked GDLs thereon, a vertical screw shaft screw-connected through the screw bar, a motor and a belt drive for driving the screw shaft.

* * * * *